(12) United States Patent
Leister et al.

(10) Patent No.: US 8,705,156 B2
(45) Date of Patent: Apr. 22, 2014

(54) HOLOGRAPHIC DIRECT VIEW DISPLAY HAVING AN APODIZATION DEVICE

(75) Inventors: Norbert Leister, Dresden (DE); Stephan Reichelt, Dresden (DE)

(73) Assignee: Seereal Technologies S.A., Munsbach (LU)

( * ) Notice: Subject to any disclaimer, the term of this patent is extended or adjusted under 35 U.S.C. 154(b) by 392 days.

(21) Appl. No.: 13/000,414

(22) PCT Filed: Jan. 16, 2009

(86) PCT No.: PCT/EP2009/050476
§ 371 (c)(1),
(2), (4) Date: Dec. 21, 2010

(87) PCT Pub. No.: WO2009/156191
PCT Pub. Date: Dec. 30, 2009

(65) Prior Publication Data
US 2011/0096381 A1    Apr. 28, 2011

(30) Foreign Application Priority Data

Jun. 26, 2008   (DE) .......................... 10 2008 002 692

(51) Int. Cl.
*G02B 5/32*    (2006.01)
(52) U.S. Cl.
USPC .......................................................... 359/21
(58) Field of Classification Search
USPC ..................................................... 359/1–35
See application file for complete search history.

(56) References Cited

U.S. PATENT DOCUMENTS

| | | |
|---|---|---|
| 6,163,391 A | 12/2000 | Curtis et al. |
| 2005/0168790 A1 | 8/2005 | Latypov et al. |
| 2010/0188718 A1 | 7/2010 | Renaud-Goud et al. |

FOREIGN PATENT DOCUMENTS

DE    10 2006 030535 A1    1/2008

OTHER PUBLICATIONS

International Search Report, dated May 8, 2009, issued in priority International Application No. PCT/US2009/050476.

*Primary Examiner* — Jennifer L. Doak
*Assistant Examiner* — Kimberly N Kakalec
(74) *Attorney, Agent, or Firm* — Saul Ewing LLP

(57) ABSTRACT

The invention relates to apodization in a holographic direct view display. Known apodization functions are utilized/modified for an apodization mask such that the functions reduce the intensities of selected higher magnitudes of diffractions. The holographic direct view display comprises a controllable light modulator having modulator cells and modulating impinging coherent light into a phase and/or amplitude, and an array of apodization masks. The apodization masks have the same apodization function for a predetermined group of modulator cells, by means of which function a complex amplitude transparency can be set for the modulator cells. This transparency corresponds to an individually predefined course of intensity in a far field of the light modulator, wherein the predefined course of intensity includes a reducing of the light intensity of higher magnitudes of diffractions, and/or of the interfering light emitted by the light modulator.

20 Claims, 7 Drawing Sheets

HOLOGRAPHIC DIRECT VIEW DISPLAY HAVING AN APODIZATION DEVICE

CROSS REFERENCE TO RELATED APPLICATIONS

This application claims the priority of PCT/EP2009/050476, filed on Jan. 16, 2009, which claims priority to German Application No. 10 2008 002692.1, filed Jun. 26, 2008, the entire contents of which are hereby incorporated in total by reference.

BACKGROUND OF THE INVENTION

The present invention relates to a holographic direct-view display which comprises at least one controllable spatial light modulator with a matrix of modulator cells for diffracting light and an array of apodisation masks. Further, this invention relates to an iterative process for finding an apodisation function for apodisation masks.

The field of application of this invention includes optoelectronic display devices which shall have a large display area and/or little structural depth, such as direct-view displays for PC, TV, mobile telephones or other appliances with the function of displaying information.

The matrix of modulator cells of a controllable spatial light modulator (SLM) comprises actively switchable modulator regions and inactive regions in between (division bars, cell boundaries). The area ratio of these two regions is known as fill factor. The inactive regions form a fixed grating structure at which light is diffracted. The diffracted light will show characteristic multi-beam interference effects if the spatial light modulator is illuminated with coherent or partly coherent light. The diffraction far field of a spatial light modulator corresponds with the Fourier transform of the complex amplitude transmission or complex amplitude reflection of the spatial light modulator. The inactive regions are predefined and characteristic for each type of SLM. At these regions the diffraction causes higher diffraction orders to occur, which can be to the detriment of the functionality and quality of an optical system.

If they are superposed on the actual image of the holographic reconstruction, higher diffraction orders can for example adversely affect the functionality of optical systems in the form of increased noise, twin images or e.g. by bright spots around the image points of the SLM which are generated in the far field. An efficient means for blanking out higher diffraction orders, which are caused by the modulator cells of the SLM matrix, which is known in the prior art are spatial filters which are disposed in an intermediate focal point of the optical system which follows the SLM. The spatial filter only transmits the desired diffraction order while all other diffraction orders are blocked by the spatial filter, which is designed as an aperture mask. A disadvantage of such a filter arrangement is that an intermediate image or an intermediate focus must be created following the SLM in the optical path. First, this considerably increases the structural depth of the optical system. Secondly, the aperture (effective opening) of the subsequent optical system (a lens or mirror) must be about as large as that of the SLM. This limits the applicability of such spatial filters to relatively small SLM and thus to projection-type displays.

Apodisation is a method for optical filtering where the outer rings of an Airy disc, which represent the higher orders, are suppressed. Advantage is taken of this method for example in imaging systems for improving the image contrast at the expense of the resolution of imaging systems, in that for example a special gradient filter is disposed in the exit aperture of the optical path.

The apodisation of modulator cells can be achieved with the help of an apodisation function $t_{SLMpixel}(x,y)$. Generally, apodisation functions are computed in accordance with their actual usage, and realised e.g. in a mask or filter. Further, a number of known apodisation functions which can be described analytically are discussed in the literature. In addition to a cosine or triangular function, there are for example apodisation functions which are known under the names of Blackman, Hamming, or Welch functions. These apodisation functions offer solutions for general apodisation tasks.

Document DE 10 2006 030 535 A1 filed by the applicant describes the use of apodisation functions in spatial light modulators with a pixel matrix in a projection display. The apodisation of the pixel matrix is here achieved exclusively by a respective modulation of the light which illuminates the spatial light modulators. For this, a plane coherent illumination wave is modulated with a suitable function whose periodicity is matched to the pixel structure of the modulators.

In a holographic direct-view display for generating a holographic reconstruction, the controllable light modulator is illuminated with sufficiently coherent light and generates a separate visibility region (also known as observer window) for each eye in the far field. The intensities of the higher diffraction orders can be emitted into the neighbouring visibility region and thus disturb the observer when watching the reconstruction. There are hitherto no known solutions based on apodisation which serve to reduce cross-talking of higher diffraction orders among these visibility regions.

As is generally known, to become effective, apodisation must satisfy the boundary conditions which are given by the actually used light modulator means.

Summarising, the prior art exhibits the following deficiencies. For the generation of a true holographic reconstruction, where the brightness values are represented as realistic as possible, it is required that higher diffraction orders are specifically reduced in at least one certain region. These regions lie at a defined position in the observer plane. In particular, it shall be possible to reduce particularly greatly those diffraction orders which fall into the other eye.

Another application which is not realised with conventional apodisation functions is the increase of the relative luminous intensity in at least one diffraction order other than the zeroth order relative to all other diffraction orders.

SUMMARY OF THE INVENTION

It is the object of the present invention to reduce by way of an apodisation the higher diffraction orders caused by the modulator cells in the far field of a controllable spatial light modulator of a holographic direct-view display which comprises a matrix of controllable modulator cells, where the light modulator is a component of an optical system which does not permit filtering by a spatial filter.

The problems shall be eliminated with the help of an array of apodisation masks. The light modulator shall also allow an individual specification of the intensity distribution in different diffraction orders of diffracted coherent light.

At the same time, other disturbing effects which are caused by the design of the modulator cells shall also be eliminated as far as possible so to improve the imaging quality of the optical system.

Further, it shall be possible either to give the apodisation function a continuous profile or to realise an apodisation function with discrete values of individual steps across the modulator cell in the apodisation mask.

Further, known apodisation functions shall generally be modified such that these modifications are valid for different applications and are technologically feasible.

The transmittance of the holographic direct-view display shall thereby only be reduced to a very small degree.

The object is solved according to this invention by a holographic direct-view display, comprising At least one controllable spatial light modulator comprising a matrix of modulator cells for diffracting light, said spatial light modulator realising an individually predefined intensity profile in the far field of the light modulator, An array of apodisation masks, where each modulator cell for modulating the phase and/or amplitude of sufficiently coherent light is assigned to an apodisation mask, At least one defined group of modulator cells which are assigned to apodisation masks with an identical apodisation function, and A complex amplitude transparency which is to be set for the at least one group of modulator cells and which sets the apodisation function for this group of modulator cells according to the predefined intensity profile which is to be realised, where the predefined intensity profile includes a reduction of the luminous intensity in at least one higher diffraction order and/or of the stray light which is emitted by the light modulator.

Complex amplitude transparency is understood in this context as a complex-valued filtering function T which has an amplitude A and a phase $\phi$ in the form $T(x,y)=A(x,y)\cdot\exp[i\phi(x,y)]$.

It describes the change in amplitude and phase of an electromagnetic wave which runs through the apodisation mask.

In an embodiment of the present invention, the apodisation function of an apodisation mask exhibits at least in one dimension a non-constant profile of the absolute value and/or phase of the complex amplitude transparency. For example, the apodisation function can at least in one dimension have a maximum in the centre of a modulator cell, and a gradually decreasing complex amplitude transparency towards the edges of a modulator cell.

To be able to compute the apodisation function, the given shape, size and geometry and an already inherent complex amplitude transparency of a modulator cell which is to be apodised must be known. In particular, it is essential to know the parameters pixel pitch, fill factor, and shape and position of the pixel aperture. If the fill factor FF of a single modulator cell is for example FF>0.5, and if the area of the modulator cell is not too small, then a specific selection of the transmittance profile of the individual modulator cell serves to achieve that intensities of higher diffraction orders of an observer window do not cross-talk to the observer window of the neighbouring eye in a disturbing manner.

The apodisation function is defined at discrete scan points by numerical values which describe the complex amplitude transparency at those scan points, where the scan points exhibit a mutual distance which can be spatially resolved by the apodisation mask.

In one embodiment of the holographic direct-view display, at least two controllable light modulators are sandwiched together, where either each light modulator has a dedicated apodisation mask or the at least two light modulators have a common apodisation mask.

Further, one light modulator of the at least two controllable light modulators of the holographic direct-view display is designed to form a prism array which comprises electrowetting cells. It is provided that the apodisation masks are assigned to the prism array of electrowetting cells or combined with the latter. The location of the array of apodisation mask in the holographic direct-view display is not firmly defined.

The apodisation masks of the given group of modulator cells can preferably set an intensity profile with predefined intensity values in a given section of the far field of the diffracted light. The given section of the far field can comprise either only negative or only positive diffraction orders in at least one dimension.

It is further possible that all modulator cells have the same apodisation function for one application.

In a further embodiment of the invention, the holographic direct-view display for 3D presentations is designed such that the modulator cells are assigned in given groups always to a left and to a right observer eye for generating visibility regions which are respectively assigned to the observer eyes in an observer distance range to the light modulator. In the apodisation masks of the one group, the intensity profile is set such that it is minimised at the observer eye of the other group and vice versa.

Further, the apodisation masks can exhibit an apodisation function whose complex amplitude transparency is formed as a variable phase function with constant absolute value. According to another embodiment, the apodisation mask exhibits an apodisation function whose complex amplitude transparency is of a binary type, so to reduce preferably stray light. In combination with an electrowetting cell, a binary apodisation mask is a suitable element for minimising phase defects which occur at the margin of this cell.

Further, an array of binary masks can artificially reduce the fill factor of the array of electrowetting cells if a certain apodisation function is preferably used for which that fill factor is sensible.

For precisely determining the apodisation function, an iterative process can be used which is run as a computing routine in a computing unit which provides the result in a memory unit for being retrieved.

The iterative process is based for example on a Fourier transformation method where the transform is carried out between the plane of the light modulator and its Fourier plane in the far field. The light which is diffracted at the modulator cells can be approximated to given intensity values in the given section of the far field.

The holographic direct-view display can comprise an array of amplitude-only masks or phase-only masks as apodisation masks. The amplitude masks can be manufactured for example by way of projection-lithographic, interference-lithographic or greyscale-lithographic methods. For this, a photosensitive material, such as a holographic film, is exposed where the function is exposed point-wise or two-dimensionally. Alternatively, it is possible to realise a direct exposure in high-energy beam sensitive (HEBS) glass by an electron beam or in laser direct write (LDW) glass by a laser beam. Yet another manufacturing option is digital printing.

The phase masks can be made by generating surface profiles or by way of refractive index modulation in polymers or glass. A photosensitive material (e.g. photoresist) is exposed for this as well. The information is written to the material two-dimensionally, so that an array of apodisation masks can be realised by adjoining multiple areal regions. Alternative manufacturing options include areal contact or proximity exposure and projection lithography, where again multiple regions can be adjoined to form an array of apodisation masks. Yet another possibility of manufacturing is the local ion exchange by the implantation of lithium ions in glass substrates.

The above-mentioned methods also allow amplitude masks to be transformed into phase masks.

The masks can also be manufactured with the help of methods which are not mentioned above, but whose usage would be considered appropriate by a person skilled in the art.

In another embodiment, the holographic direct-view display can be a holographic colour display in which the modulator cells which are to be assigned to a certain primary colour form a given group. In order to minimise the intensity values, in such a display the given section of the far field includes a region of identical diffraction angles for all primary colours.

The present invention further relates to a method for finding an apodisation function for apodisation masks which are arranged in an array and which are assigned to a matrix of modulator cells of a controllable spatial light modulator, where the method is carried out in iterative process steps.

The process steps are in detail:
Determining the position of diffraction orders of the modulator cells of a given group,
Definition of an individually predefined intensity profile in preferred diffraction orders or sections thereof in the far field,
Definition of an initial apodisation function for a single modulator cell of the given group, and
Stepwise optimisation of the complex amplitude transparency of the apodisation function to approximate to the predefined intensity profile in the preferred diffraction orders of sections thereof in the far field.

In order to determine the complex amplitude transparency of a modulator cell, a number of scan points inside and outside the aperture of the modulator cell is defined. Further, the intensity profile in the far field is determined by the square absolute value of the Fourier transform of the complex amplitude transparency at an identical number of scan points. After that, the stepwise optimisation of the complex amplitude transparency of the apodisation function takes place in that in a further process step The scan points outside the aperture of the modulator cell are set to zero,
A Fourier transformation of the complex amplitude transparency is carried out to the Fourier plane in the far field,
The amplitude of the scan points in the preferred diffraction orders or sections thereof in the far field is set to a value which corresponds with the square root of the predefined intensity value at that scan point, and
A Fourier back-transformation of the complex values of the far field is carried out to the plane of the light modulator.

BRIEF DESCRIPTION OF THE DRAWINGS

The present invention will be described in detail below with the help of embodiments in conjunction with the accompanying drawings, where.

DETAILED DESCRIPTION OF THE INVENTION

Figure 1A:
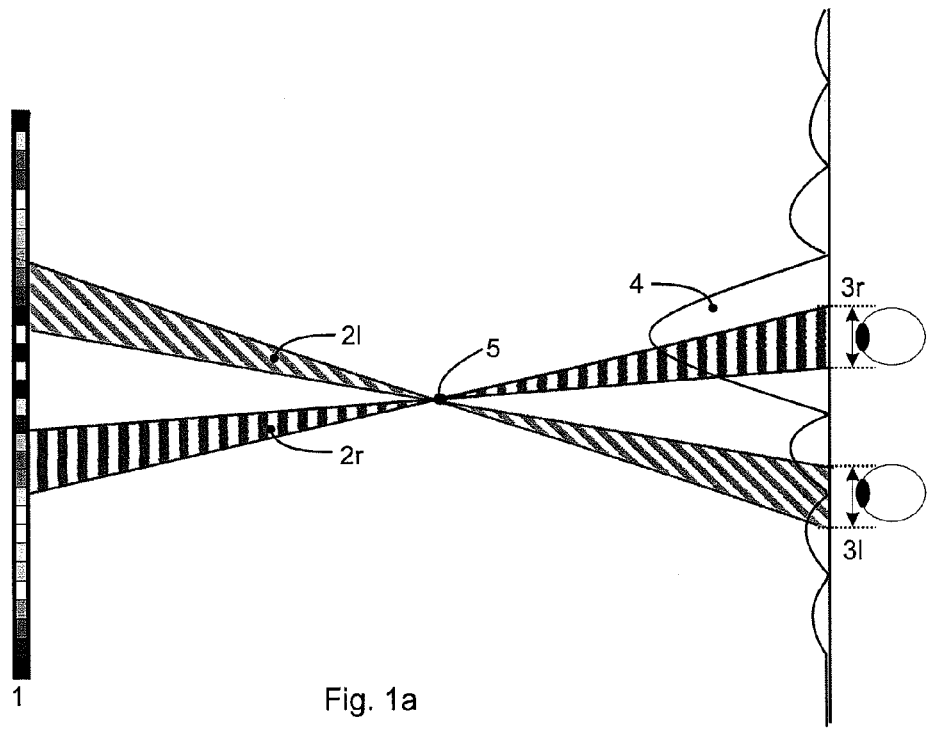
FIG. 1a is a schematic view of a holographic direct-view display without apodisation mask according to the prior art.

The present invention relates to a holographic direct-view display with at least one controllable spatial light modulator which comprises modulator cells 7' 7" which are arranged in a matrix 7, and where each modulator cell 7', 7" is assigned to an apodisation mask 6', 6" which has an apodisation function. The light modulator modulates the phase and/or amplitude of sufficiently coherent light. The phase and/or amplitude values which are encoded on the light modulator can for example represent a hologram which serves to reconstruct a three-dimensional object in a holographic direct-view display. Various combinations of light modulator and apodisation masks are possible. For example, a light modulator which modulates the phase only can be combined with an apodisation mask which apodises the amplitude only, and vice versa. Generally, both light modulator and apodisation mask can be used for a complex-valued modulation.

Determining the apodisation function for apodisation masks of modulator cells according to this invention is based on the approach that—in addition to the fix initial values—target values are defined for parameters to be set. Here, a complex amplitude shall specifically be set in the far field of the SLM which corresponds with the Fourier plane of the SLM. The complex amplitude is realised by way of a Fourier transformation from the SLM to the far field.

Specifically, the parameter of luminous intensity in the Fourier plane is given. The luminous intensity shall be widely reduced in preferred diffraction orders or just in a selected range of the preferred diffraction orders. The shape of the active region of a modulator cell represents the position of the diffraction orders in the far field and thus in the Fourier plane. Since for example in a holographic direct-view display the observer eyes are situated there as well, diffraction orders of the hologram which is encoded on the SLM and which is intended for the left eye can hit the right eye and interfere with the hologram which is intended for the right eye, and vice versa.

Thanks to the combination of modulator cells of the light modulator and apodisation mask, an apodisation function in an apodisation mask which is computed with the respective parameters causes the incident light to be modulated such that the intensity values in the Fourier plane come very close to the intensity profile which is given there or which are identical to that latter.

Another parameter for the apodisation function can be a phase function with constant amplitude. Other parameters in conjunction with the light modulation which are not specifically mentioned here can also be optimised with the method according to this invention for determining an apodisation function for apodisation masks.

The target values can be approximated with the help of an iterative process according to an embodiment of the present invention, thus optimising the intensity profile.

The apodisation masks are designed as an array and are disposed ideally as close as possible to the light-modulating optical layer of at least one SLM. The array is either disposed directly on at least one SLM as an additional front or rear layer or integrated into the cover glass of the at least one SLM. Further, the division bars between the active regions of a modulator cell can already be designed such that they have the effect of an apodisation array. The apodisation masks are aligned with the given arrangement of modulator cells.

According to an embodiment, in addition to the SLM on which e.g. hologram values of a 3D scene are encoded, the holographic direct-view display can comprise a prism array which comprises electrowetting cells as a further SLM which preferably modulates a wave front in its direction of propagation, but which can also modulate the phase and/or amplitude of that wave front.

FIG. 1a shows schematically a top view of a holographic direct-view display according to the prior art, i.e. without apodisation mask. The numeral 1 denotes a holographic display device, 2l and 2r denote the reconstruction beams of an object point 5 of a three-dimensional scene, 3l and 3r denote the visibility regions, also referred to as observer windows, for a respective left and right observer eye in the far field of the display device 1, and 4 denotes the intensity distribution in the visibility region 3r for the right observer eye. The intensity distribution 4 of the reconstruction beam 2r also shows the occurring higher diffraction orders, which cause cross-talking, thus adversely affecting the left observer eye.

Figure 1B:
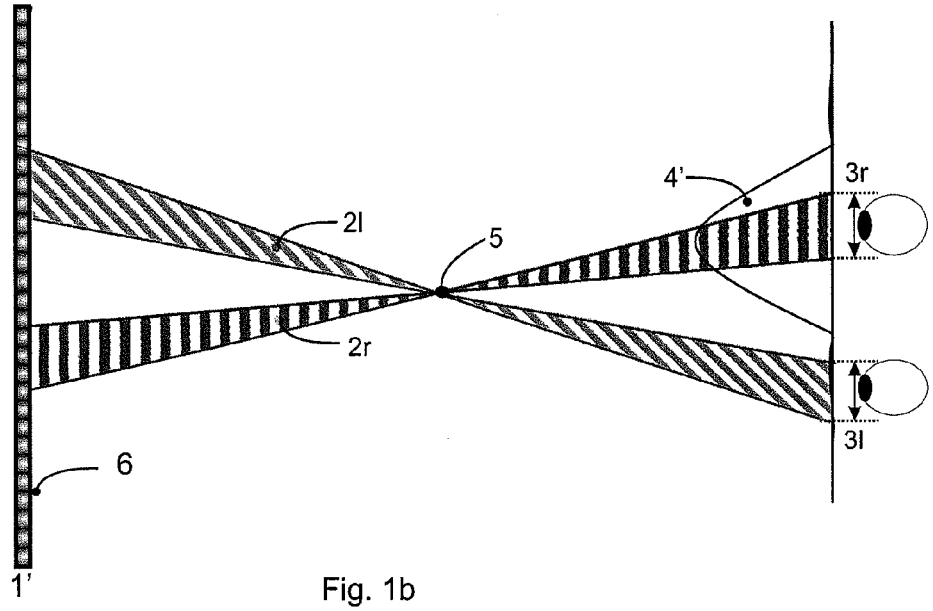
FIG. 1b is a schematic view of a holographic direct-view display with apodisation mask according to this invention.

FIG. 1b shows schematically a top view of a holographic direct-view display according to this invention with an array of apodisation masks 6 on the display device 1. The reconstruction beam 2r of the object point 5 generates in the visibility region 3r for the right observer eye an intensity distribution 4'. At the position of the left observer eye the higher diffraction orders of this intensity distribution 4' are reduced such that they do not disturb the other observer eye.

Figure 2:
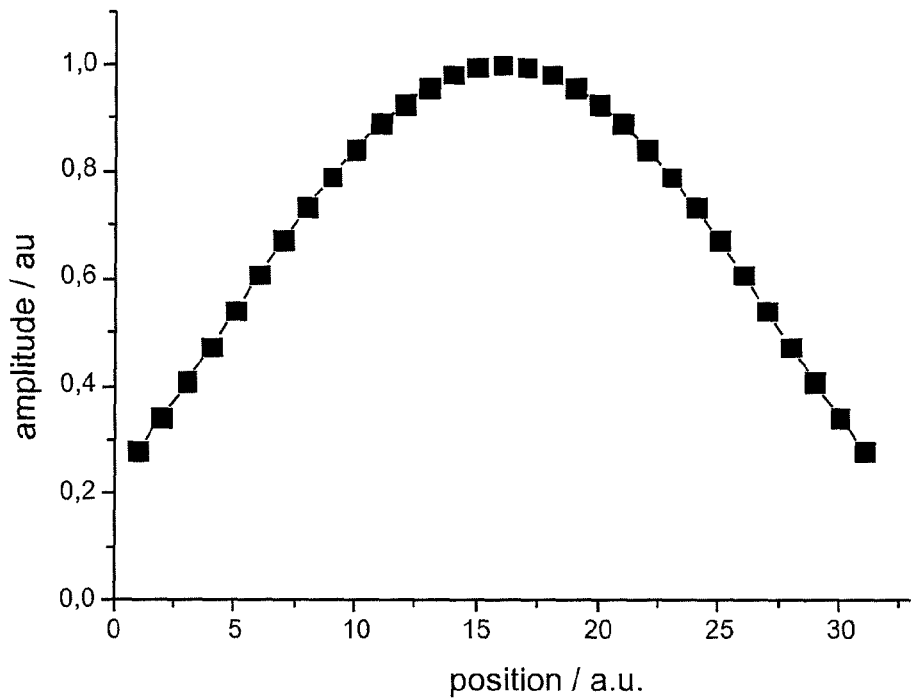
FIG. 2 is a graphic representation of the amplitude profile of an apodisation function for a modulator cell for the homogeneous reduction of diffraction orders starting with the $\pm 2^{nd}$ order.

FIG. 2 is a graphic representation which shows an apodisation function which can be realised in an apodisation mask for a modulator cell. This apodisation function uniformly reduces diffraction orders starting with the $\pm 2^{nd}$ order of diffracted light according to a target. The exemplary computation was only performed for one dimension in this Figure. Generally, the areal extent of the modulator cell in two dimensions must be considered in the computation. In the example, the modulator cells are assumed to have a rectangular shape and thus to exhibit a rectangular transmittance curve.

For computing the apodisation function it is important to know the distance between two adjacent modulator cells of the light modulator. This allows the location of the diffraction orders to be found precisely in a matrix of modulator cells, in particular if only individual higher diffraction orders are to be reduced. Knowing the distance is less important if the intensities are to be reduced in contiguous ranges of neighbouring diffraction orders.

At a defined position at a distance D from the light modulator, a diffraction order has the extent $D \cdot \lambda / p$ in one dimension, where $\lambda$ is the wavelength of the light and p is the distance (pitch) between the centres of two adjacent modulator cells of the same given group in that dimension.

Figure 3:
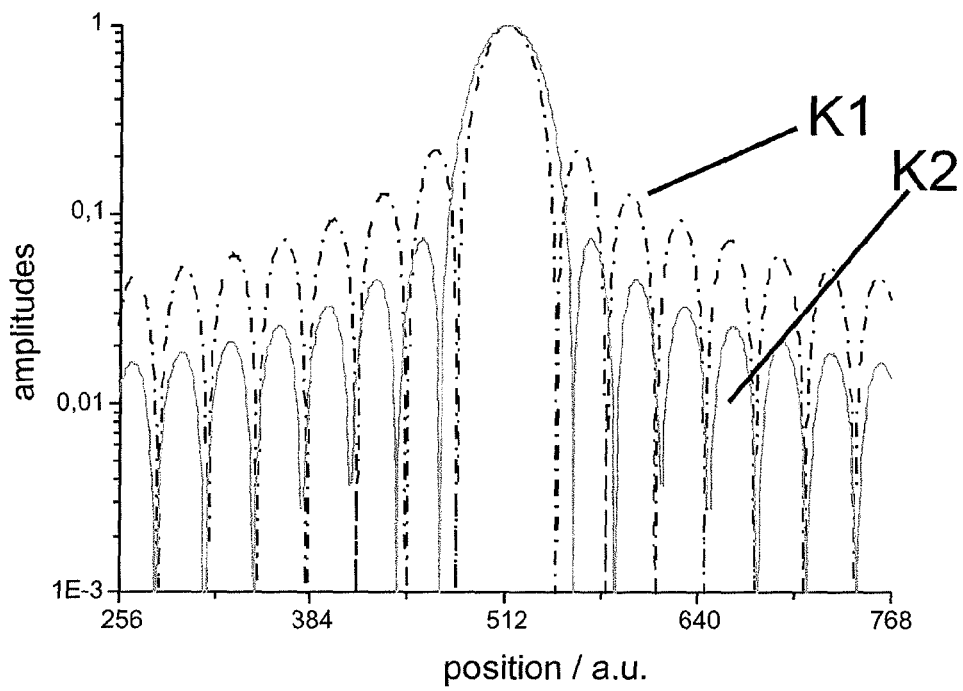
FIG. 3 is a graphic representation of the intensities in individual diffraction orders in the Fourier plane, computed with and without iteration steps.

FIG. 3 shows the diffraction pattern of a single modulator cell with and without apodisation mask in the Fourier plane of the light modulator, where the amplitudes are shown on a logarithmic scale.

Curve K1 shows the diffraction pattern which is computed without apodisation as a sinc function for a rectangular transmittance which is constant across the aperture of the modulator cell. Such a transmittance profile where the amplitude is set to the value 1 at all scan points within the aperture of the modulator cell is also used as the initial value for the iterative process with which curve K2 was computed. In a modulator cell with an aperture which is as large as the cell distance, the distance between two minima of the sinc function would correspond with the extent of a diffraction order. If the aperture is smaller than the cell distance, the diffraction orders are smaller by the same ratio of aperture and cell distance.

The curve K2 shows an amplitude profile in the Fourier plane which was computed with the help of the iterative process, resulting from the apodisation function of FIG. 2. The iterative process was terminated after five iteration steps and the result was used in the computation of the apodisation function.

The relative intensities of the higher diffraction orders of K2—in the diagram left and right of the central lobe—are clearly reduced compared to K1.

Because here a symmetrical reduction of the positive and negative diffraction orders was stipulated, the result of the computation is a distribution of real amplitude or intensity values in the apodisation function.

This apodisation function can be realised in a first embodiment of an apodisation mask for uniform reduction of higher diffraction orders. The result of the computation is qualitatively similar to the curve which would be obtained with conventional analytical apodisation functions. The example shows that the iterative process can also be applied to a general case. The advantages of using the iterative process for modifying an apodisation function will become even clearer in the second embodiment.

Figure 4:
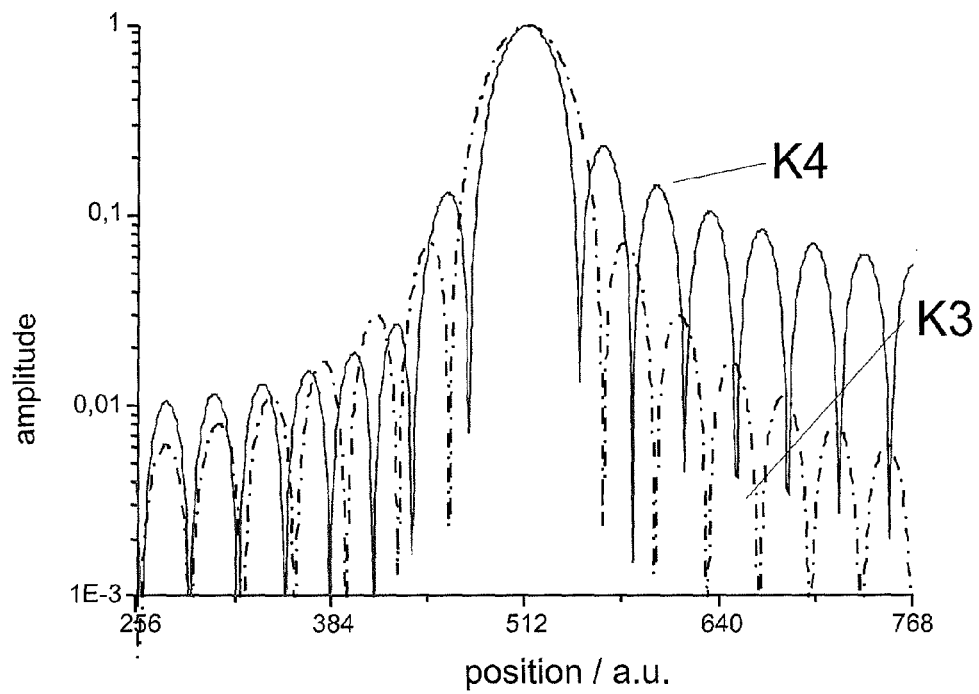
FIG. 4 is a graphic representation of the intensities in the Fourier plane for a cosine-shaped apodisation function and for a reduction of negative diffraction orders only, computed iteratively.
Figure 5:
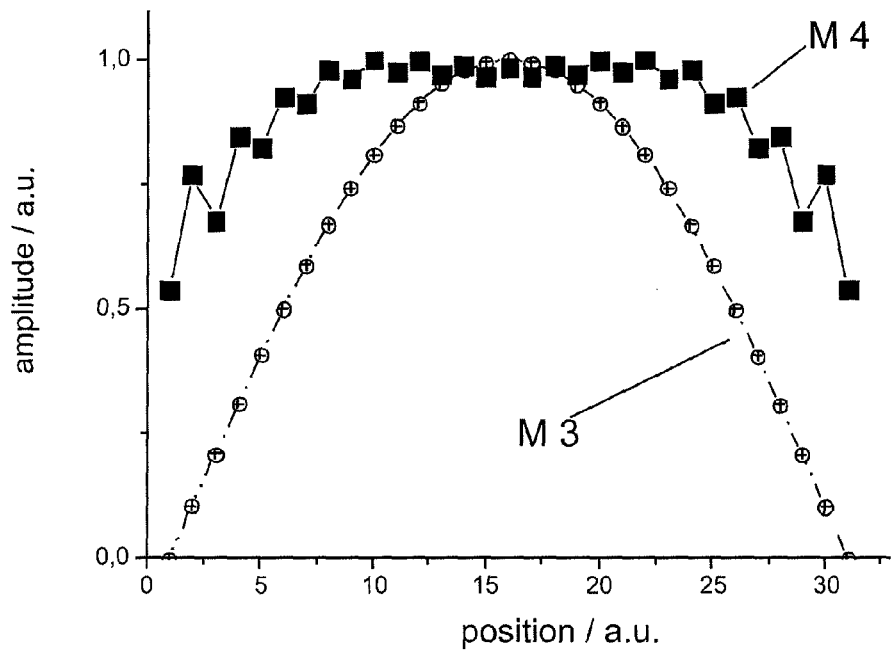
FIG. 5 is a graphic representation of an amplitude profile of a cosine-shaped apodisation function and of the amplitude profile of the iteratively computed complex-valued apodisation function across a modulator cell according to FIG. 3.
Figure 6:
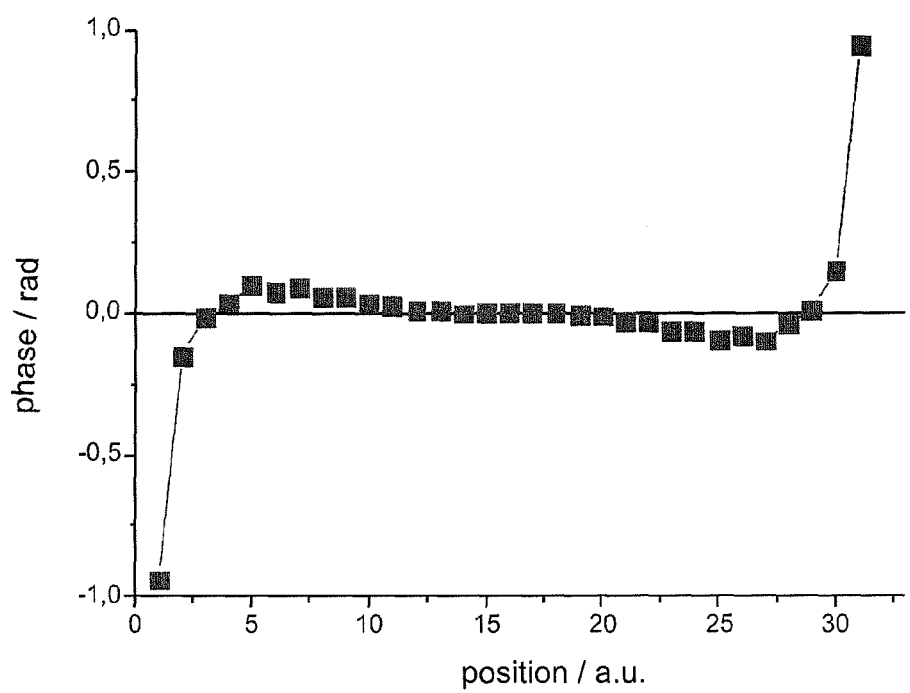
FIG. 6 is a graphic representation of a phase profile of an apodisation function of complex values across a modulator cell according to FIG. 3.

The diagrams in FIGS. 4 to 6 illustrate a second embodiment of an apodisation mask in which an apodisation function is realised which only reduces negative diffraction orders.

An application of such an embodiment would be a holographic direct-view display with a light modulator where one group of modulator cells are used for the generation of a visibility region for the left eye and another group of modulator cells are used for the generation of a visibility region for the right eye.

In a light modulator of a holographic display for generating a reconstruction, the Fourier plane is at the same time the plane where the visibility region is situated in which the reconstruction is visible. Cross-talking of the left visibility region to the right eye is then e.g. only affected by the intensity in preferred positive diffraction orders of the respective group of modulator cells. Cross-talking from the right visibility region to the left eye is only affected by negative diffraction orders of the other group of modulator cells, so that only the negative diffraction orders of that other group must be reduced.

FIG. 4 shows the amplitude profiles of the diffraction pattern in the Fourier plane scaled to 1 for a reduction of diffraction orders with a cosine-shaped curve of the apodisation function (curve K3) and the result of the iterative computation with a reduction only of negative diffraction orders (curve K4).

The intensity profile of curve K4 was computed with iteration steps. This reduces the negative higher diffraction orders about as well as with the cosine-shaped apodisation function. The positive higher diffraction orders are about as high as in the diffraction pattern of the rectangular transmittance profile without apodisation, i.e. of the sinc function K1 in FIG. 3.

As regards the remaining intensity in the higher diffraction orders, using only the negative diffraction orders does not show any advantage in this embodiment. The advantage will only become clear when the apodisation profile in the modulator cell is considered which causes the respective reduction of negative orders.

FIGS. 5 and 6 are graphic representations of an amplitude profile and of a phase profile of an apodisation function of complex values across a modulator cell according to FIG. 4.

FIG. 5 shows in addition to the curve M4 of the amplitude profile of complex values the amplitude profile of a cosine-shaped apodisation as curve M3. In this cosine-shaped apodisation, the phase is constant across the modulator cell. The amplitude profile of the cosine-shaped apodisation function causes light to be absorbed in the marginal areas of the modulator cell. Altogether, an apodisation mask which is provided with this apodisation function clearly reduces the total transmittance of a modulator cell. It is 50% if the apodisation is only carried out in one dimension, and 25% in the case of a two-dimensional cosine apodisation. The 50% correspond with the mean value of the squared cosine (intensity=amplitude squared) between $-\pi/2$ and $\pi/2$. This reduces the luminous intensity in the higher diffraction orders relative to the zeroth diffraction order, but the absolute intensity will disadvantageously be reduced equally in all diffraction orders, including the zeroth one. This cannot be seen in FIG. 4. There, the amplitude profiles are normalised to 1 to facilitate the comparison of the reduction of higher orders.

In contrast, the transmittance with the apodisation function which is found using the iterative process is much higher. Referring to FIG. 5, the amplitude of the curve M4 and thus the intensity is almost 1 in the central region of the modulator cell, and it declines slightly towards the edges.

The restriction to the reduction of negative higher diffraction orders shows an about equally good result in these diffraction orders, but without the above-mentioned disadvantage of a substantial loss in intensity in the other used diffraction orders.

The resulting apodisation function is complex-valued, because the reduction of higher orders is not symmetrical to the zeroth order.

Due to the symmetrical behaviour of the diffraction orders, an apodisation function for the reduction of all positive higher diffraction orders can be obtained without a new iterative process in that the amplitude profile of the apodisation function is chosen to be the same, but the phase profile is mirrored.

In a holographic direct-view display with a light modulator where one group of modulator cells is used for the generation of a visibility region for the left eye and another group for the right eye, the apodisation mask would have the amplitude profile as shown in FIG. 5, curve M4, for all modulator cells. As regards the phase profile, however, one group of modulator cells would have the profile as shown in FIG. 6, and the other group would have a phase profile which is mirrored to this phase profile.

It becomes apparent from what has been said above that the modified profile of the apodisation function cannot be described simply by one equation. The second embodiment shows that the method can be used generally in applications where no analytic apodisation functions are known.

A further optimisation of the apodisation function is possible if not all positive or all negative higher diffraction orders are reduced, but only preferred diffraction orders. In the holographic direct-view display discussed here, these are preferably those diffraction orders which hit the neighbouring eye.

Which orders are embraced by this definition depends on parameters like the cell distance (pitch) of the modulator cells and the preferred observer distance to the display. The affected orders can for example be the $+3^{rd}$ and $+4^{th}$ or the $-3^{rd}$ and $-4^{th}$ diffraction order.

In a holographic direct-view display where the modulator cells are not fixedly assigned with the left or right eye, it can make sense to compute the apodisation function such that preferred orders such as the $+3^{rd}$ and $+4^{th}$ or the $-3^{rd}$ and $-4^{th}$ diffraction order are reduced in the same way for all modulator cells. This applies for example to holograms which are displayed sequentially to the left and right eye. Alternatively, it applies to an observer tracking feature in a display which assigns a certain modulator cell to the left eye for one observer position and to the right eye for another observer position. Cross-talking to the respective other eye can then be reduced on either side with the same modulator cells.

Such an apodisation function has advantages over the uniform reduction of all higher diffraction orders.

Figure 7:
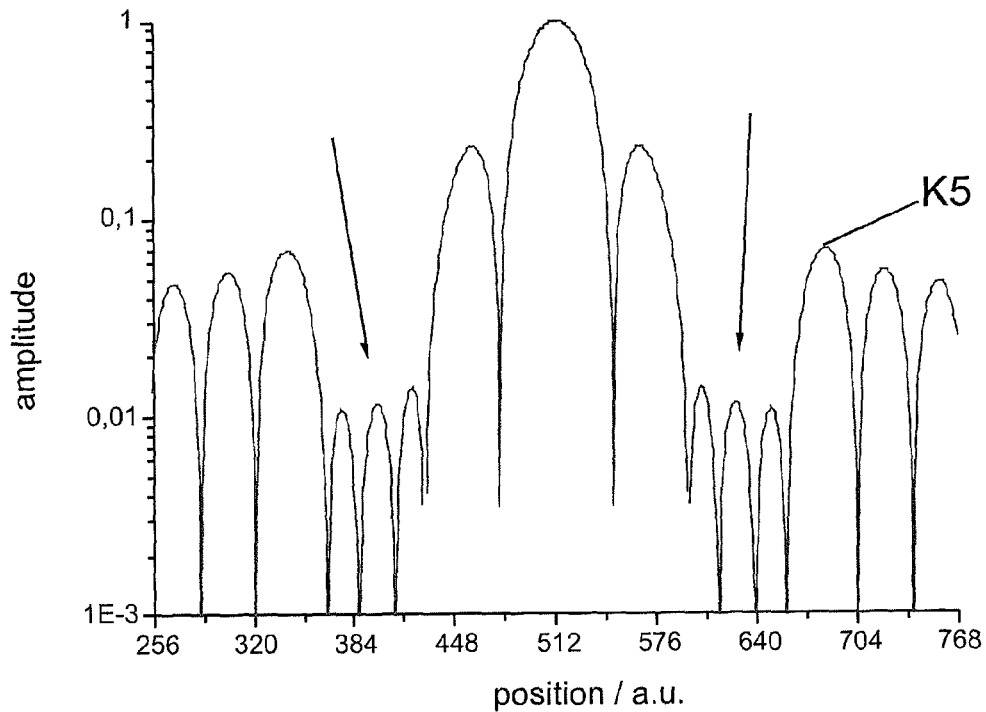
FIG. 7 is a graphic representation of the intensities in the Fourier plane for a reduction of a region of negative and positive diffraction orders.

FIG. 7 shows the amplitude profile K5 normalised to 1 of the diffraction pattern in the Fourier plane for a reduction of a region of preferred diffraction orders (indicated by arrows in the diagram). Here, the reduction is better than with a cosine-shaped apodisation by the curve K3 in FIG. 4.

Figure 8:
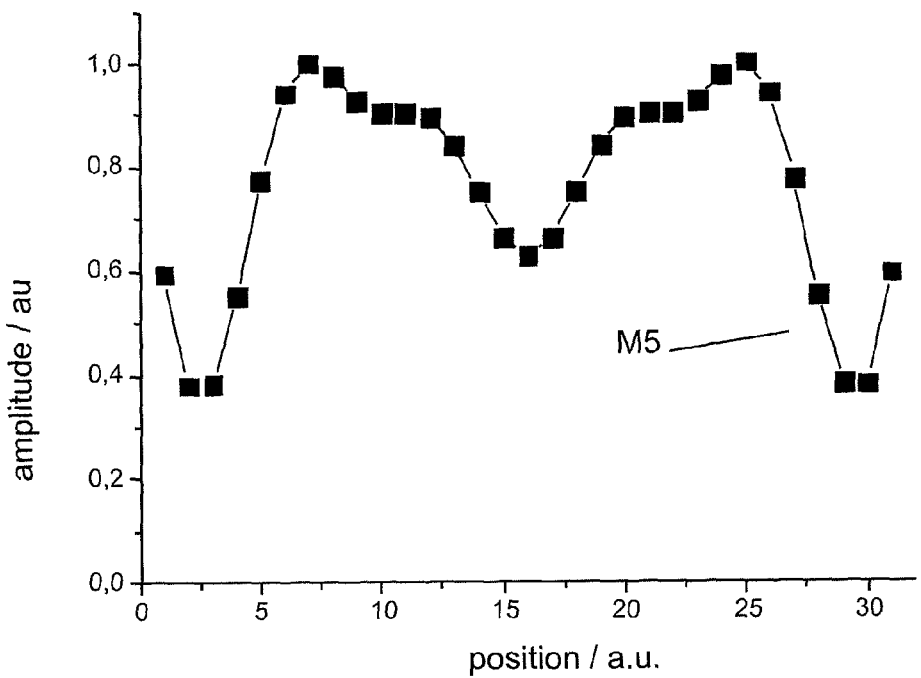
FIG. 8 is a graphic representation of an amplitude profile of an apodisation function across a modulator cell according to FIG. 6.

FIG. 8 shows the amplitude profile of curve M5 over a modulator cell according to FIG. 7. Because of the symmetrical profile, the apodisation function is here real-valued again. The phase is also constantly zero.

With a transmittance of about 62% relative to a modulator cell without apodisation mask, the transmittance is higher than in the case of a cosine-shaped apodisation, where it would amount to about 50% only.

In other applications, the iterative computation—with an according definition of target values—can also yield an increase in the intensity values of preferred diffraction orders.

Figure 9:
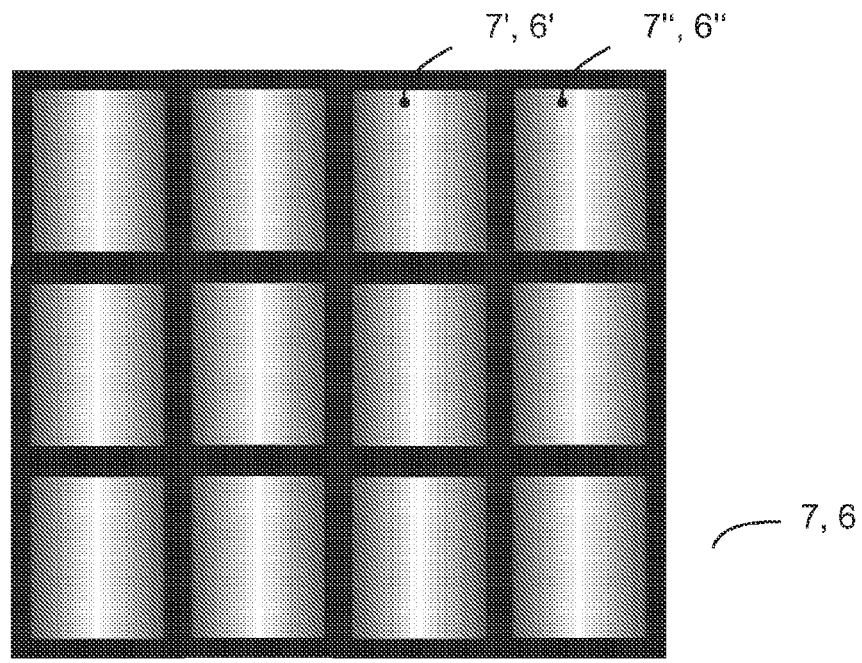
FIG. 9 is a schematic view of an embodiment of an array of apodisation masks where all modulator cells have the same apodisation function.

FIG. 9 shows schematically a detail with regularly arranged modulator cells 7', 7" of a light modulator, each of which being assigned with an apodisation mask 6', 6" with a one dimensionally computed apodisation function. One-dimensional here means that the amplitude and phase values of the apodisation function only change in one direction, here horizontally, and are the identical in the orthogonal direction, here vertically, for different positions in the modulator cell 7', 7". Further, in this example there is only one group of modulator cells, this means that all modulator cells 7', 7" have the same apodisation function.

Figure 10:
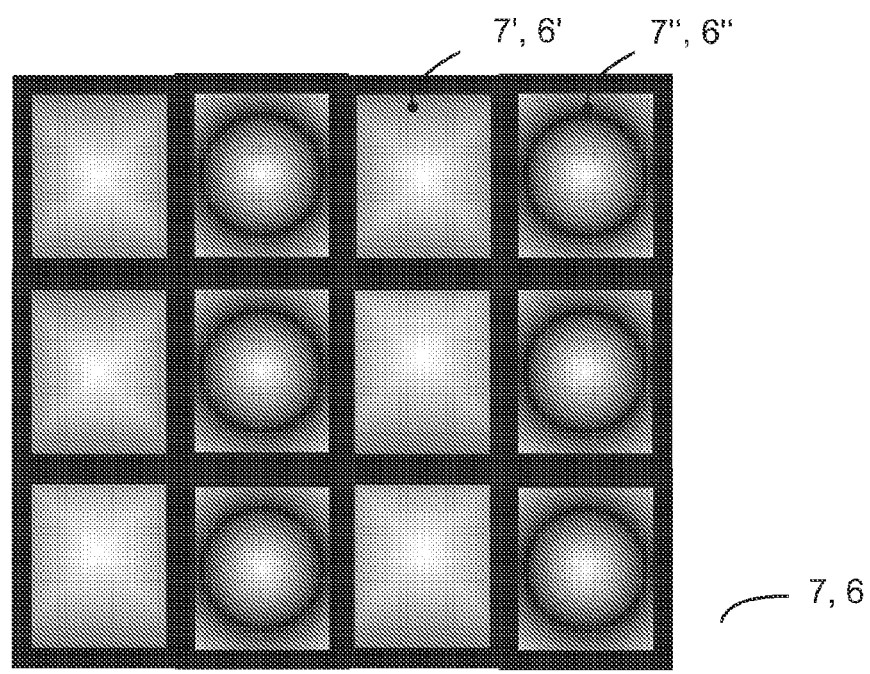
FIG. 10 is a schematic view of an embodiment of an array of apodisation masks where two groups of modulator cells are given which have different apodisation functions.

The diagram in FIG. 10 shows schematically a detail with regularly arranged modulator cells 7', 7", which form two groups of modulator cells.

The apodisation mask 6', 6" comprises for both groups a different apodisation function which is additionally always computed two-dimensionally.

These groups of modulator cells can be used for different purposes, and the apodisation function is computed separately for each group.

Two-dimensional here means that the amplitude and phase values of the apodisation function change in two directions, horizontally and vertically, in the modulator cell.

Figure 11:
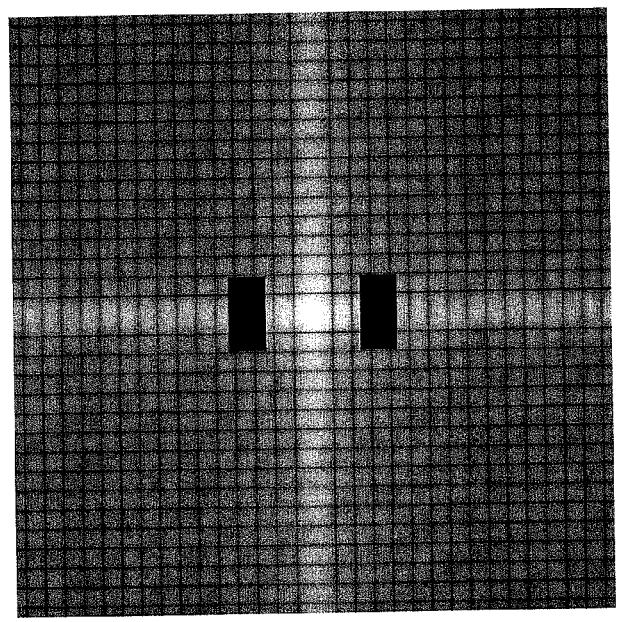
FIG. 11 is a schematic view which illustrates the reduction of preferred diffraction orders in a two-dimensional diffraction pattern.

FIG. 11 shows schematically the diffraction pattern of a square modulator cell as a greyscale profile in two dimensions, which is realised by a two-dimensional apodisation function. The relative brightness is shown in a non-linear way. This diagram serves as an example for a reduction of a range of preferred diffraction orders.

Similar to FIG. 10, only those diffraction orders are reduced which would fall on the right or left neighbouring eye if the other eye is situated in the zeroth diffraction order in a holographic direct-view display. The range of reduced diffraction orders is also confined vertically, which is shown in the form of the two black rectangles in the drawing. This result is achieved with an apodisation function which has a transmittance of about 77%.

Another example of the application of groups of modulator cells with different apodisation functions is the presentation of 3D objects in colour.

In many types of light modulators, a coloured representation is achieved by way of spatial interleaving of modulator cells of different primary colours, which are for example obtained with the help of red, green or blue colour filters. With such spatial interleaving of colours, the modulator cells of each primary colour form a given group, where different apodisation functions are found for each of those groups.

If a coherent illumination is used, it must be noted when finding the apodisation function that the width of a diffraction order changes in proportion with the wavelength.

In a holographic direct-view display with visibility regions for the left/right eye, where the disturbing cross-talking between the two visibility regions is to be prevented with the help of an apodisation mask, the higher diffraction orders for red, green and blue light have different positions in relation to the neighbouring eye. To achieve a substantial reduction of the diffraction orders, the apodisation function must therefore be computed separately with different set-point values in the Fourier plane for the groups of modulator cells of each individual colour.

The division of the modulator cells of a light modulator in colour groups can be combined with other systems of group divisions. If in a 3D display modulator cells are additionally fixed assigned to the left or right eye, then those modulator cells for red light and left eye can form one group for which an apodisation function is found, for example.

It is a further advantage of this invention that for finding an apodisation function for a group of modulator cells or for at least one light modulator in the holographic direct-view display an iterative process is carried out only once offline in a computing unit. In contrast to other applications of iterative algorithms, the computational load and the required computing time do not play a role then.

Now, a method for determining an optimised apodisation function for apodisation masks which are assigned to regularly arranged modulator cells of a spatial light modulator will be described, said method including an iterative process.

First, intensity values are defined to serve as set-point values in preferred diffraction orders or sections thereof for a defined position in the optical path for carrying out an iterative process.

After having defined an apodisation function as an initial apodisation function, with the help of the known shape and size of a modulator cell of the given group of modulator cells the transmittance profile of the modulator cell is represented by a number of scan points in a grid inside and outside the modulator cell. A transmittance profile is generally understood to be an amplitude profile or an amplitude and phase profile in the form of complex values.

The grid of these scan points can be matched to the resolution with which a transmittance profile is technologically feasible to be made across a modulator cell if the point resolution of the manufacturing process is limited. Ideally, an analogue transmittance profile is generally desired.

For example, a modulator cell with a size of 60×60 µm where the transmittance profile is to be realised with a resolution of 1 µm can be represented by 60 scan points in each dimension.

If it is technologically feasible to manufacture a continuous transmittance profile, the latter can still be approximated in the computation by scan points.

The scan points which represent the transmittance profile within the modulator cell are given initial phase and amplitude values. In the most simple case, this can be a rectangular function with the transmittance of 1 within the aperture of the modulator cell, or any other known analytical apodisation function.

There is no transmittance outside the aperture of the modulator cell, which is why scan points which are situated there are set to zero. An initial apodisation function is provided with the given initial values, and this function is optimised with the help of an iterative process. It is in particular the distribution of intensity values in the Fourier plane of the light modulator which is optimised.

The phase and amplitude values are transformed from the plane of the light modulator to its Fourier plane, whereby the Fourier plane is given a distribution of amplitude values or complex values over multiple diffraction orders.

Since the computation is performed with the help of a Fourier transformation, the number of diffraction orders in the Fourier plane which are computed corresponds with the number of scan points within the modulator cell (aperture and cell margins), and the number of complex values within a diffraction order in the Fourier plane corresponds with the ratio of total number of scan points and scan points within a modulator cell.

In the Fourier plane, the amplitude values or complex values are replaced by set-point values in the given diffraction orders or section thereof, and in the remaining diffraction orders the above-mentioned values are taken from the transformation and back-transformed to the plane of the light modulator.

In the plane of the light modulator, the amplitude values or complex values within the aperture of the modulator cells which are computed by way of back-transformation are carried forward to the next iteration step, and the amplitude values or complex values which lie outside the aperture of the modulator cells are set to zero.

Now, another iteration step with a transformation of the given values to the Fourier plane can be started.

The iterative process is either terminated after a predefined number of iteration steps, or when another predefined termination criterion is satisfied.

It is for example possible to compare the setpoint values in higher diffraction orders with the actual values in the Fourier plane before a replacement as a termination criterion. The iteration will be terminated if the deviations of the actual values from the setpoint values falls below a certain threshold. Complex values which are the computed result of a Fourier transformation between the plane of a light modulator and its Fourier plane in one iteration step in one of these two planes are referred to as actual values here.

It is possible to introduce further conditions for the cycle of the iterative process. For example, it is possible to specify that the amplitude and phase values are quantised within the modulator cell, and that those quantised values are used for the apodisation function which have the smallest difference to the respective actual value instead of carrying over actual values in each iteration step for the scan points in the modulator cell.

For this, the amplitudes of the actual values are preferably normalised such that their range of values matches that of the quantised values. A normalisation to a range of between 0 and 1 can be achieved with the help of a division by the maximum amplitude.

Such a computation of a quantised apodisation function is particularly sensible if the apodisation function is computed in the context of a certain manufacturing process of the apodisation mask and if only a limited number of different greyscale values or phase values can be realised with that method. A special case of it is a binary apodisation mask which only contains black and fully transparent sections, i.e. two quantisation steps.

In another modification of the method, it can be specified that the apodisation function is a phase-only function. A phase function has the advantage that the transmittance of the light modulator is not reduced by the apodisation mask. For a phase function, the phase part of a complex-valued actual value is taken over and its absolute value is set to 1 at the scan points within the aperture of the modulator cell in each iteration step.

For reducing only negative or only positive orders, it is for example possible to use a phase-only function. Although it delivers remaining intensity values which are somewhat higher in these diffraction orders in contrast to the curve K4 in FIG. 4, this result is achieved completely without any reduction in transmittance of the light modulator.

Another option for the termination criterion is to set the amplitude to a minimum value.

According to a certain method for manufacturing an apodisation mask, it makes sense to choose the scan points for the computation depending on the size of the modulator cell such that their distance either corresponds with the spatial resolution of that mask or is slightly larger, so that the apodisation mask can be made by way of interpolation between the scan points.

The advantage of an iterative process for determining the apodisation function is that an apodisation function which is optimised to the specific application can be computed and realised in an apodisation mask. In contrast, standard apodisation functions only allow a general reduction of the light intensity uniformly in all higher diffraction orders, where the reduction in intensity typically outweighs the intensity which is optimised for a certain higher diffraction order.

Moreover, the reduction in transmittance of the light modulator is lower when using the apodisation function which is optimised to a certain application than when using a standard apodisation function.

The apodisation masks which are provided with the determined apodisation function realise the desired amplitude transparency in the controllable light modulator and thus a reduction of higher diffraction orders. This light modulator can be used in a holographic direct-view display with visibility regions in the Fourier plane which are assigned separately to a left/right eye, or in a stereoscopic display for the presentation of spatial objects to observer eyes. In the latter type of display, an illumination with coherent light would be essential. With the help of the apodisation function it is achieved that cross-talking between the visibility regions of the stereo views between left and right eye is minimised.

If in the above-mentioned displays a spatial interleaving of visibility regions is realised which are generated at a defined distance to the observer, and if the modulator cells are fixedly assigned to a left or right observer eye, then groups of modulator cells can be specified such that the diffracted light of each group generates visibility regions in the Fourier plane which are assigned to the respective observer eyes. The set luminous intensity of the one group is minimised at a given observer distance at the observer eye of the other group and vice versa. In this case, the modulator cells for the left observer eyes exhibit an apodisation function which differs from that of the modulator cells for the right observer eyes.

For modulator cells of a controllable light modulator, apodisation masks are designed with which the light modulator can preferably realise an individually specified intensity distribution in the diffraction orders of diffracted coherent light. For this, an apodisation function for the apodisation masks was determined, where target values of luminous intensities in given higher diffraction orders must be considered of in a simplified manner in the computation. It is technologically feasible that the thus modified apodisation function is realised in an apodisation mask. Further, it is possible either to give the apodisation function a continuous profile or to realise an apodisation function with discrete values in single steps across the modulator cell in the apodisation mask.

This invention also allows to use such amplitude and/or phase profiles in modulator cells as apodisation functions which cannot be described by an analytical function.

The apodisation is here preferably made possible with simple functions (cosine etc.) or, in the most simple case, with binary steps. Further, disturbing margin effects in modulator cells can be weakened by an apodised intensity or phase profile in that for example the margin of the modulator cell is darkened or cut off. This also allows the reconstruction quality to be improved in the visibility region itself.

The invention can be applied both in modulators with liquid crystal cells and in modulators with electrowetting cells or other types of cells. The SLM and thus the holographic or autostereoscopic displays can either be of a reflective or of a transmissive type. The displays which are described in this invention are direct-view displays.

In the case MEMS-based reflective piston micro-mirror arrays are used as SLMs, an array of apodisation masks can be realised in that a modulator cell is given a reflectivity gradient.

The invention claimed is:

1. Holographic direct-view display, comprising

At least one controllable spatial light modulator with a matrix of modulator cells for diffracting light, said spatial light modulator realising an individually predefined intensity profile in the far field of the light modulator, An array of apodisation masks, where each modulator cell for modulating the phase and/or amplitude of sufficiently coherent light is assigned to an apodisation mask, At least one defined group of modulator cells which are assigned to apodisation masks with an identical apodisation function, and A complex amplitude transparency which is set for the at least one group of modulator cells and which sets the apodisation function for this group of modulator cells according to the predefined intensity profile which is to be realised, where the predefined intensity profile includes a reduction in the luminous intensity in at least one higher diffraction order and/or of the stray light which is emitted by the light modulator.

2. Holographic direct-view display according to claim 1, wherein the apodisation function exhibits at least in one dimension a non-constant profile of the absolute value and/or phase of the complex amplitude transparency.

3. Holographic direct-view display according to claim 2, wherein the apodisation function has a maximum in the centre of a modulator cell, and a gradually decreasing complex amplitude transparency towards the edges of a modulator cell.

4. Holographic direct-view display according to claim 2, wherein the apodisation function is computed depending on the given shape, size and geometry, and on an already inherent complex amplitude transparency of a modulator cell.

5. Holographic direct-view display according to claim 1, wherein the apodisation function is defined at discrete scan points by numerical values which describe the complex amplitude transparency at those scan points, where the scan points exhibit a mutual distance which is spatially resolvable by the apodisation mask.

6. Holographic direct-view display according to claim 1, wherein at least two controllable light modulators are sandwiched together, where either each light modulator has a dedicated apodisation mask or the at least two light modulators have a common apodisation mask.

7. Holographic direct-view display according to claim 1, wherein the apodisation masks of the given group of modulator cells set an intensity profile with predefined intensity values in a given section of the far field of the diffracted light.

8. Holographic direct-view display according to claim 7, wherein the given section of the far field comprises either only negative or only positive diffraction orders in at least one dimension.

9. Holographic direct-view display according to claim 1, wherein all modulator cells have identical apodisation functions.

10. Holographic direct-view display according to claim 1, wherein modulator cells are assigned to either a left or right observer eye, and where modulator cells form given groups of modulator cells for generating visibility regions which are respectively assigned to those observer eyes in an observer distance range to the light modulator, where the intensity profile of the one group which is set with the help of the apodisation mask is minimised at the position of the observer eye of the other group and vice versa.

11. Holographic direct-view display according to claim 1, wherein the apodisation mask exhibits an apodisation function whose complex amplitude transparency is formed as a variable phase function with constant absolute value, or where the apodisation mask exhibits an apodisation function whose complex amplitude transparency is formed as a variable phase function with constant absolute value, and where the apodisation mask exhibits an apodisation function whose complex amplitude transparency is of a binary type, so to reduce preferably stray light.

12. Holographic direct-view display according to claim 1, wherein for determining the apodisation function an iterative process is used which is run as a computing routine in a computing unit, and which provides the result in a memory unit for being retrieved.

13. Holographic direct-view display according to claim 12, wherein the iterative process includes a Fourier transformation where the transform is carried out between the plane of the light modulator and its Fourier plane in the far field, where the light which is diffracted at the modulator cells can be approximated to given intensity values in the given section of the far field.

14. Holographic direct-view display according to claim 1, wherein the apodisation mask is an amplitude mask which can be manufactured by way of projection-lithographic, interference-lithographic or greyscale-lithographic methods.

15. Holographic direct-view display according to claim 1, wherein the apodisation mask is a phase mask which can be manufactured by way of generating surface profiles or refractive index modulation in polymers or glass substrates.

16. Holographic direct-view display according to claim 1, wherein those modulator cells which are assigned to respectively one primary colour form a given group of modulator cells.

17. Holographic direct-view display according to claim 16, wherein the given section of the far field includes a range of identical diffraction angles for all primary colours for minimising the intensity values.

18. Method for determining an apodisation function for apodisation masks which are arranged in an array and which are assigned to a matrix of modulator cells of a controllable spatial light modulator according to claim 1, wherein the method is carried out in iterative process steps.

19. Method according to claim 18, comprising the following process steps:
   Determining the position of diffraction orders of the modulator cells of a given group,
   Definition of an individually predefined intensity profile in preferred diffraction orders or sections thereof in the far field,
   Definition of an initial apodisation function for a single modulator cell of the given group, and
   Stepwise optimisation of the complex amplitude transparency of the apodisation function to approximate to the predefined intensity profile in the preferred diffraction orders of sections thereof in the far field.

20. Method according to claim 19, wherein the complex amplitude transparency of a modulator cell is determined by defining a number of scan points inside and outside the aperture of the modulator cell,
   where the intensity profile in the far field is determined by the square absolute value of the Fourier transform of the complex amplitude transparency at an identical number of scan points,
   where the stepwise optimisation of the complex amplitude transparency of the apodisation function takes place in that in a further process step
      The scan points outside the aperture of the modulator cell are set to zero,
      A Fourier transformation of the complex amplitude transparency is carried out to the Fourier plane in the far field,
      The amplitude of the scan points in the preferred diffraction orders or sections thereof in the far field is set to a value which corresponds with the square root of the predefined intensity value at that scan point, and
      A Fourier back-transformation of the complex values of the far field is carried out to the plane of the light modulator.

* * * * *